United States Patent

Noji et al.

[11] Patent Number: 5,989,726
[45] Date of Patent: Nov. 23, 1999

[54] MULTI-LAYER CERAMIC ELECTRONIC PART

[75] Inventors: Takashi Noji, Takefu; Mamoru Ogawa, Fukui-ken, both of Japan

[73] Assignee: Murata Manufacturing Co., Ltd.

[21] Appl. No.: 08/886,432

[22] Filed: Jul. 2, 1997

[30] Foreign Application Priority Data

Jul. 4, 1996 [JP] Japan ................................. 8-195546

[51] Int. Cl.⁶ ................................. B32B 15/00
[52] U.S. Cl. .................. 428/594; 428/600; 428/609; 428/615; 428/620; 428/628; 428/630; 428/641; 428/687; 242/56.1
[58] Field of Search .......................... 24/25, 42; 264/58, 264/61, 64; 83/93, 436; 242/56.1; 428/600, 609, 615, 620, 628, 630, 641, 687, 266

[56] References Cited

U.S. PATENT DOCUMENTS

| | | | |
|---|---|---|---|
| 4,760,276 | 7/1988 | Lethellier | 307/18 |
| 5,177,841 | 1/1993 | Hamuro et al. | 29/25.42 |
| 5,224,550 | 7/1993 | Hamuro et al. | 29/25.42 |

FOREIGN PATENT DOCUMENTS 8130160  5/1996  Japan .

*Primary Examiner*—Merrick Dixon
*Attorney, Agent, or Firm*—Ostrolenk, Faber, Gerb & Soffen, LLP

[57] ABSTRACT

A highly reliable multi-layer ceramic electronic part in which is compact, in which cracks tend not to occur in the ceramic element even in cases where it is handled in bulk by a chip mounting device. A plurality of electrodes (internal electrodes) are disposed within a ceramic element whose length $L \leq 1.0$ mm, height $H \leq 0.5$ mm and width $W \leq 0.5$ mm. The thickness $t_1$ of a ceramic outer layer portion of the multi-layer ceramic electronic part, is 0.15 mm or less. The thickness of the ceramic outer layer portion $t_1$ and the thickness $t_2$ of the portion where the internal electrodes are disposed have the relationship $\frac{1}{4}\, t_2 \leq t_1 \leq \frac{1}{3}\, t_2$.

9 Claims, 2 Drawing Sheets

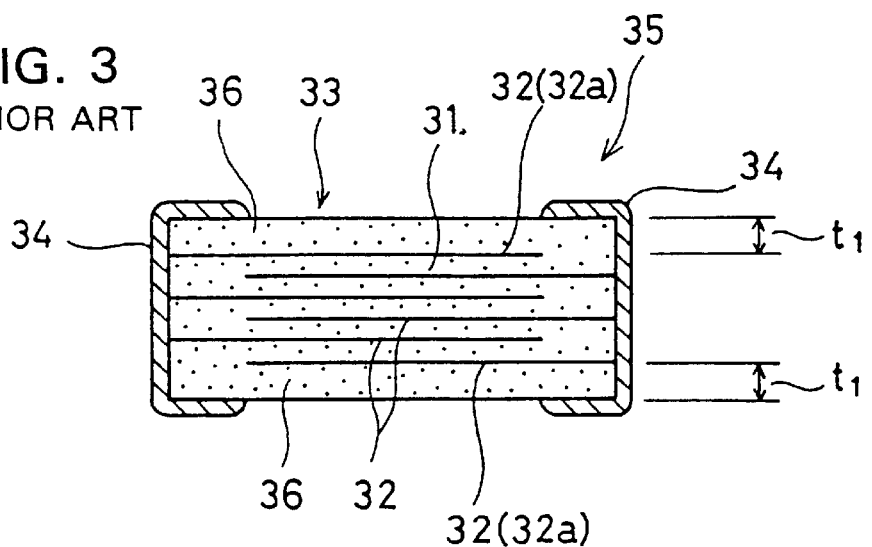
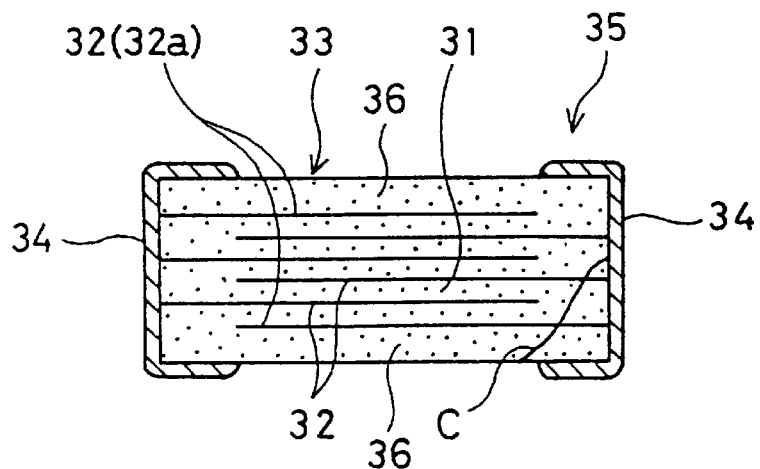
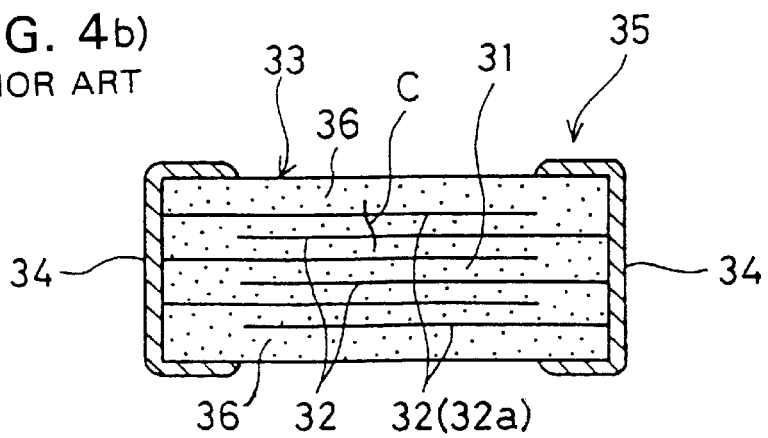

MULTI-LAYER CERAMIC ELECTRONIC PART

BACKGROUND OF THE INVENTION

1. Field of the Invention

The present invention relates to electronic parts, in particular to multi-layer ceramic electronic parts having a structure in which a plurality of internal electrodes are disposed throughout a ceramic layer in a ceramic element.

2. Description of the Related Art

One type of surface-mounted type ceramic electronic part, for example as shown in FIG. 3, has a rectangular parallelepiped-shaped ceramic element 33 in which a plurality of electrodes (internal electrodes) 32 are disposed so as to face each other via a ceramic layer 31. External electrodes 34 are disposed at opposite ends of the electronic part and are conductively coupled with respective internal electrodes 32, to form a multi-layer ceramic capacitor 35.

This type of ceramic electronic part has become increasingly miniaturized, which has resulted in an extremely compact ceramic electronic part such as the ceramic element 33 shown in FIG. 2, whose length (L) is 1.0 mm or less and height (H) and width (W) are 0.5 mm or less. Also, in such a ceramic electronic part, the distance (thickness of a ceramic outer layer portion 36) $t_1$ from the internal electrode 32 (32a) of the outermost layer to the surface of the ceramic element 33 is very small at 0.10 mm or less.

However, in the field of miniaturization described above, ceramic electronic parts in which the thickness $t_1$ of the ceramic outer layer portion 36 is small have little mechanical strength (resistive strength etc.), and in a case where they are handled in bulk (for example by a chip mounting device), cracks C in the ceramic element occur easily due to mechanical impacts, as shown in FIGS. 4(a) and (b). Thus, for example, cracks C can occur across a plurality of internal electrodes 32, resulting in the problem that the desired electrical characteristics become unattainable.

SUMMARY OF THE INVENTION

The present invention is intended to solve the above problem, and advantageously can provide a highly reliable multi-layer ceramic electronic part which is compact, has sufficient mechanical strength (resistive strength etc.), and, in cases where it is handled in bulk by a chip mounting device, is not susceptible to cracks in the ceramic element due to mechanical impacts.

In order to achieve the above result, the inventors performed various tests and studies and found that, by setting the thickness of the ceramic outer layer portion to a predetermined ratio with respect to the thickness of the portion where the internal electrodes were disposed, resistive strength, etc., could be improved and it was possible to suppress the occurrence of cracks. The present invention was arrived at as a result of this discovery, after further tests and studies.

In a multi-layer ceramic electronic part according to a first aspect of the present invention, in a ceramic element whose length (L) is 1.0 mm or less, height (H) is 0.5 mm or less and width (W) is 0.5 mm or less, a plurality of electrodes (internal electrodes) are laminated so as to face each other via a ceramic layer, a distance (thickness of a ceramic outer layer portion) $t_1$ from an internal electrode of an outermost layer to a surface of the ceramic element is 0.10 mm or less, and the thickness $t_1$ of the ceramic outer layer portion is a quarter or more of a thickness $t_2$ of a portion where the internal electrodes are disposed.

As described above, by setting the thickness $t_1$ of the ceramic outer layer portion to one quarter or more of the thickness $t_2$ of the portion where the internal electrodes are disposed, external impacts imposed on the multi-layer ceramic electronic part are absorbed by the ceramic outer layer portion and thus impacts to the portion where the internal electrodes are disposed are alleviated. Consequently, in cases where the ceramic electronic part is handled in bulk for example by a chip mounting device, it is possible to suppress and prevent the occurrence of cracks due to mechanical impacts. Also, if cracks do occur, it is possible to prevent them from reaching the internal electrode portion and from occurring across a plurality of electrodes.

Also, according to another aspect of the present invention, the multi-layer ceramic electronic part is characterized in that the thickness $t_1$ of the ceramic outer layer portion is from a quarter up to a third of the thickness $t_2$ of the portion where the internal electrodes are disposed. Therefore, the dimensions of the multi-layer ceramic electronic part are not excessively large and it is possible to attain a multi-layer ceramic electronic part which is compact and highly reliable. Note that by making $t_1/t_2$ equal ¼ or more, sufficient crack prevention effectiveness can be attained, therefore there are no particular deficiencies when limiting $t_1/t_2$ to the above range.

BRIEF DESCRIPTION OF THE DRAWINGS

These and other features, aspects and advantages of the present invention will become better understood with reference to the following description, appended claims and accompanying drawings, wherein:

FIG. 3 is a cross-sectional view of a conventional multi-layer ceramic electronic part; and FIGS. 4(a) and (b) are diagrams illustrating states where a crack has occurred across the plurality of internal electrodes in a conventional multi-layer ceramic electronic part;

DETAILED DESCRIPTION OF AN EMBODIMENT

An embodiment of the present invention will be described below and its characteristics explained in more detail. Note that this embodiment will be explained with respect to a surface-mounted type multi-layer ceramic capacitor as an example.

Figure 1:
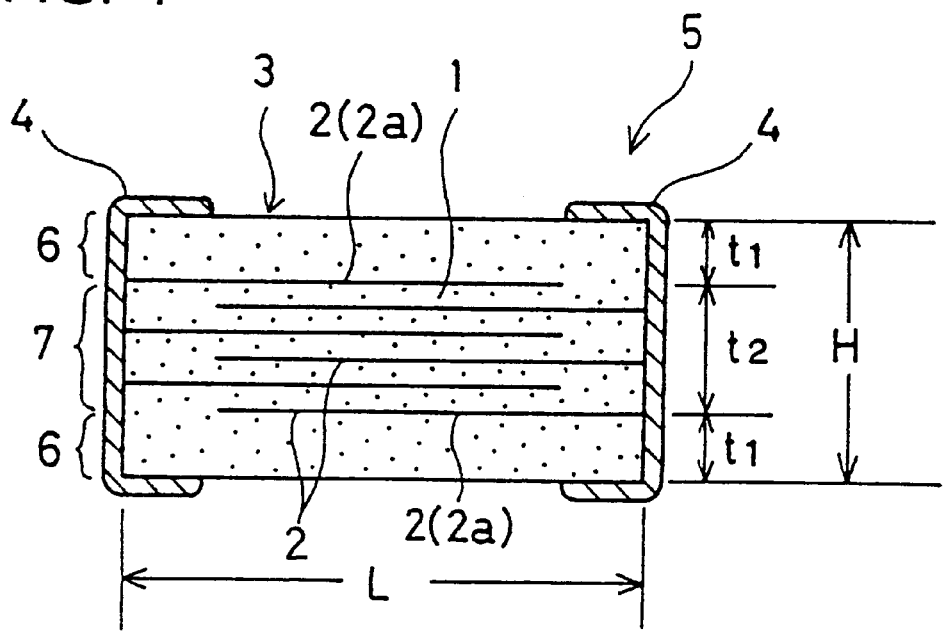
FIG. 1 is a cross-sectional view of a multi-layer ceramic capacitor (multi-layer ceramic electronic part) according to an embodiment of the present invention.
Figure 2:
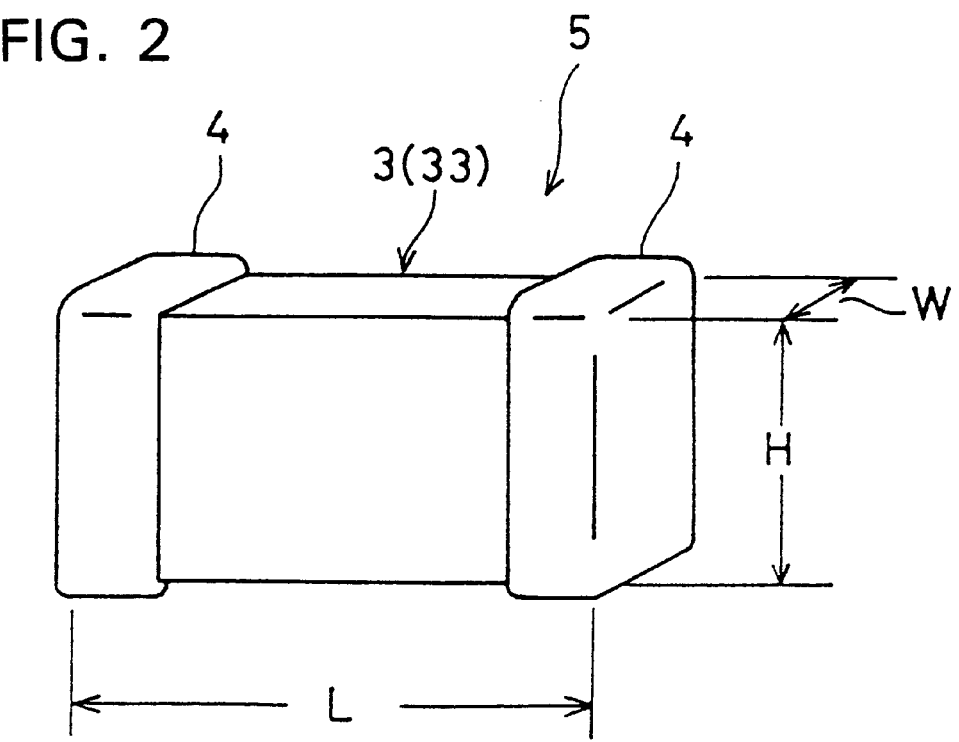
FIG. 2 is a perspective view showing the external structure of the multi-layer ceramic capacitor (multi-layer ceramic electronic part) according to an embodiment of the present invention.

FIG. 1 is a cross-sectional diagram of the multi-layer ceramic capacitor (multi-layer ceramic electronic part) according to an embodiment of the present invention, and FIG. 2 is a perspective view showing the external structure thereof.

The multi-layer ceramic capacitor 5 of this embodiment, as shown in FIG. 1, has a structure wherein a plurality of capacitance-forming electrodes (internal electrodes) 2 are laminated throughout a ceramic layer 1 so as to face each other, and external electrodes 4 are disposed at each end of the rectangular parallelepiped-shaped ceramic element 3 in which the internal electrodes 2 and ceramic layer 1 are arranged.

Also, the dimensions of the ceramic element 3 of this multi-layer ceramic capacitor 5 are length (L): 0.6 mm, height (H): 0.3 mm and width (W): 0.3 mm. Further, in this multi-layer ceramic capacitor 5, the distance $t_1$ (i.e. thickness of a ceramic outer layer portion 6) from the internal electrode 2 (2a) of the outermost layer to the surface of the ceramic element 3 is 50 μm (0.050 mm), the thickness $t_2$ of a portion 7 (internal electrode disposal portion) in which the internal electrodes 2 are disposed is 200 μm, the thickness $t_1$ of the ceramic outer layer portion 6 being one quarter the thickness $t_2$ of the internal electrode portion 7.

Thereby, where the thickness $t_1$ of the ceramic outer layer portion 6 is one quarter of $t_2$, in cases where impacts are imposed on the multi-layer ceramic capacitor 5 from external sources, these impacts are absorbed by the ceramic outer layer portion, alleviating shocks to the internal electrode disposal portion 7. As a result, even when the multi-layer ceramic capacitor 5 is compact, possession of sufficient shock resistance is possible in cases where it is handled in bulk by a chip mounting device for example. As well as preventing the occurrence of cracks in the ceramic element due to mechanical impacts, even if a crack does happen to occur, it is possible to prevent the crack reaching the internal electrode portion, thus improving reliability.

Note that although the above embodiment has been described in a case where the dimensions of the multi-layer ceramic capacitor are length (L) 0.6 mm, height (H) 0.3 mm and width (W) 0.3 mm, and $t_1$ is 50 μm and $t_2$ is 200 μm, similar effects to the multi-layer ceramic capacitor of the above embodiment can also be attained in the case of a multi-layer ceramic capacitor whose dimensions are length (L) 1.0 mm, height (H) 0.5 mm and width (W) 0.5 mm, and where $t_1$ is 83 μm and $t_2$ is 332 μm ($t_1/t_2$=¼).

Table 1 shows the relationship between the values t1 and t2 and the ratio of t1 to t2, the rate of occurrence of cracks across the plurality of internal electrodes, and the rate of occurrence of cracks in the ceramic outer layer portion, with respect to multi-layer ceramic capacitors of the present invention and multi-layer ceramic capacitors of comparative examples. Note that in each of the multi-layer ceramic capacitors indicated in Table 1, the thicknesses $t_1$ of the two ceramic outer layer portions at the upper and lower sides of the internal electrode portion are the same.

of the ceramic element were larger than the scope of the present invention, the occurrence of cracks across the plurality of internal electrodes and cracks in the ceramic outer layer portion was not detected, irrespective of the value of $t_1$ and the ratio of $t_1$ and $t_2$ ($t_1/t_2$).

However, in the cases of the multi-layer ceramic capacitors in which the dimensions of the ceramic element were within the scope of the present invention (sample numbers 1 to 9), where the value of $t_1$ and the ratio of $t_1$ and $t_2$ ($t_1/t_2$) were outside the scope of the present invention (sample numbers 1, 2, 6 and 7), cracks occurred across the plurality of internal electrodes and in the ceramic outer layer portion.

On the other hand, in the multi-layer ceramic capacitors in which the value of $t_1$ and the ratio of $t_1$ and $t_2$ ($t_1/t_2$) were within the scope of the present invention (sample numbers 3, 4, 5, 8 and 9), cracks across the plurality of internal electrodes and in all but one crack in the ceramic outer layer portion were not detected.

Note that although the above embodiment was described using multi-layer ceramic capacitors as examples, the present invention is not limited thereto and may be applied to various types of multi-layer ceramic electronic parts having a structure wherein electrodes are disposed within a ceramic element, in which cases it is possible to attain the same effects as in the embodiment described above.

The present invention is not limited to the above embodiment in other respects as well, so that various applications and configurations are possible so long as they are within the scope of the concept of the present invention with respect to the specific dimensions and shape of the ceramic element and the arrangement of the internal electrodes.

What is claimed is:

1. A multi-layer ceramic electronic part in which a plurality of internal electrodes are laminated in a ceramic element so as to face each other with ceramic layers therebetween, the ceramic element having length (L), height (H) and width (W) which are L≦1.0 mm H≦0.5 mm W≦0.5 mm, and a distance $t_1$ corresponding to a thickness of a ceramic outer layer portion of the ceramic element from an outer-

TABLE 1

| Sample Number | Dimensions of Ceramic Element (L) × (H) × (W) (mm) | Thickness of Ceramic Outer Layer Portion $t_1$ (μm) | Thickness of Internal Electrode Portion $t_2$ (μm) | $t_1/t_2$ | Rate of Cracking of Internal Electrode Portion (%) | Rate of Cracking of Ceramic Outer Layer Portion (%) |
|---|---|---|---|---|---|---|
| *1 | 0.6 × 0.3 × 0.3 | 10 | 280 | 1/28 | 10 | 4 |
| *2 | 0.6 × 0.3 × 0.3 | 30 | 240 | 1/8 | 7 | 3 |
| 3 | 0.6 × 0.3 × 0.3 | 50 | 200 | 1/4 | 0 | 1 |
| 4 | 0.6 × 0.3 × 0.3 | 70 | 160 | 1/2.3 | 0 | 0 |
| 5 | 0.6 × 0.3 × 0.3 | 100 | 100 | 1/1 | 0 | 0 |
| *6 | 1.0 × 0.5 × 0.5 | 25 | 450 | 1/18 | 2 | 1 |
| *7 | 1.0 × 0.5 × 0.5 | 50 | 400 | 1/8 | 1 | 1 |
| 8 | 1.0 × 0.5 × 0.5 | 83 | 334 | 1/4 | 0 | 0 |
| 9 | 1.0 × 0.5 × 0.5 | 150 | 200 | 1/1.3 | 0 | 0 |
| *10 | 1.6 × 0.8 × 0.8 | 50 | 700 | 1/14 | 0 | 0 |
| *11 | 1.6 × 0.8 × 0.8 | 100 | 600 | 1/6 | 0 | 0 |
| *12 | 1.6 × 0.8 × 0.8 | 133 | 534 | 1/4 | 0 | 0 |
| *13 | 1.6 × 0.8 × 0.8 | 180 | 440 | 1/2.4 | 0 | 0 |

Note also that, in Table 1, those samples with an asterisk (*) before to their numbers are comparative examples, outside the scope of the present invention. As shown in Table 1, in the cases of the multi-layer ceramic capacitors of sample numbers 10, 11, 12 and 13 in which the dimensions most internal electrode to an adjacent surface of the ceramic element is 0.10 mm or less but greater than zero, wherein:

$t_1 \geq ¼\ t_2$, $t_2$ being a thickness of a portion within the ceramic element where the internal electrodes are disposed.

2. The multi-layer ceramic electronic part according to claim 1, wherein:

$$t_1 \leq \tfrac{1}{3} t_2.$$

3. A multi-layer ceramic electronic part, comprising:

a generally rectangular parallel-piped ceramic body having top and bottom parallel surfaces, left and right generally parallel side surfaces, and front and back generally parallel side surfaces; the distance between said top and bottom surfaces being less than or equal to 1 mm, the distance between said left and right side surfaces being less than or equal to 0.5 mm and the distance between said front and back side surfaces being less than or equal to 0.5 mm; and a plurality of planar internal electrodes disposed in said ceramic body generally parallel to said top and bottom surfaces, each adjacent pair of internal electrodes facing one another with a portion of said ceramic body located therebetween, a top-most one of said internal electrodes facing said top surface of said ceramic body, a bottom-most one of said internal electrodes facing said bottom surface of said ceramic body, the distance from said top-most internal electrode to said top surface of said ceramic body being less than or equal to 0.1 mm and greater than or equal one quarter of the distance from said top-most to said bottom-most internal electrode.

4. A multi-layer ceramic electronic part in accordance with claim 3, wherein the distance from said bottom-most internal electrode to said bottom surface of said ceramic body is less than or equal to 0.1 mm and greater than or equal to one quarter of said distance from said top-most to said bottom-most internal electrode.

5. A multi-layer ceramic electronic part in accordance with claim 4, wherein said distance from said bottom-most internal electrode to said bottom surface is equal to the distance from said top-most internal electrode to said top surface.

6. A multi-layer ceramic electronic part in accordance with claim 5, wherein the distance from said top-most internal electrode to said top surface is less than or equal to ⅓ of the distance between said top-most and said bottom-most internal electrodes.

7. A multi-layer ceramic electronic part in accordance with claim 4, wherein the distance from said bottom-most internal electrode to said bottom surface is less than or equal to ⅓ of the distance between said top-most and said bottom-most internal electrodes.

8. A multi-layer ceramic electronic part in accordance with claim 3, wherein the distance from said top-most internal electrode to said top surface is less than or equal to ⅓ of the distance between said top-most and said bottom-most internal electrodes.

9. A multi-layer ceramic electronic part in accordance with claim 8, wherein the distance from said bottom-most internal electrode to said bottom surface is less than or equal to ⅓ of the distance between said top-most and said bottom-most internal electrodes.

* * * * *